United States Patent [19]

Aramaki et al.

[11] Patent Number: 5,751,339
[45] Date of Patent: May 12, 1998

[54] TELEVISION CONVERSATION/ MONITORING SYSTEM CHANGING TRANSMISSION CAPACITY RESPONSIVE TO STATE CHANGE IN REMOTE LOCATION

[75] Inventors: Toru Aramaki; Kiyoshi Ishida, both of Yokohama; Toshio Watanabe, Kamakura, all of Japan

[73] Assignee: Hitachi, Ltd., Tokyo, Japan

[21] Appl. No.: 542,031

[22] Filed: Oct. 12, 1995

[30] Foreign Application Priority Data

Oct. 12, 1994 [JP] Japan .................. 6-245881

[51] Int. Cl.⁶ .................. H04N 7/12; H04M 11/00
[52] U.S. Cl. .................. 348/17; 348/15; 379/93.08; 379/93.21; 370/524; 370/468
[58] Field of Search .................. 379/93–98, 93.08, 379/93.09, 93.11, 93.17, 93.21, 93.29; 348/14–20; 370/524, 522, 468, 467, 264

[56] References Cited

U.S. PATENT DOCUMENTS

5,371,534 12/1994 Dagdeviren et al. .................. 379/94
5,444,477 8/1995 Yamadera et al. .................. 348/13
5,585,839 12/1996 Ishida et al. .................. 348/16
5,590,127 12/1996 Bales et al. .................. 348/15

Primary Examiner—Wing F. Chan
Attorney, Agent, or Firm—Antonelli, Terry, Stout, & Kraus, LLP

[57] ABSTRACT

A television conversation/monitoring system connecting a central station and a plurality of terminal stations through an ISDN line. The central station has a picture/sound conversation/monitoring device, a picture input/output device, a sound input/output device, a system control portion and an ISDN line terminal device, and each of the terminal stations has a picture/sound conversation/monitoring device, a system control portion, a picture input/output device, a sound input/output device, a terminal station state change detecting device and an ISDN line terminal device. The central-station-side system control device has a function to control the line capacity, so that conversation and monitoring can be performed with a plurality of terminal stations simultaneously while the line capacity is changed in accordance with the state of terminals.

12 Claims, 7 Drawing Sheets

TELEVISION CONVERSATION/MONITORING SYSTEM CHANGING TRANSMISSION CAPACITY RESPONSIVE TO STATE CHANGE IN REMOTE LOCATION

BACKGROUND OF THE INVENTION

1. Field of the Invention

The present invention relates to a multimedia communication system for bidirectionally communicating sounds, pictures and data in real time through an Integrated Services Digital Network (hereinafter abbreviated to "ISDN"), and particularly relates to a television conversation/monitoring system suitable for conversation or monitoring with a plurality of terminals.

2. Description of the Related Art

A system using a private line in which the transmission capacity of a communication path for transmitting/receiving information is fixed so that the quantity of information transmissible per unit time is constant is conventionally known as a guide system, a conversation system, a monitoring system or a composite system of those systems for communicating pictures, sounds, data, or the like through an ISDN. A Metropolitan Police Board television conversation system is an example of such systems.

In the above-mentioned conventional art, a private line is used as a communication line, and the transmission capacity is fixed (for example, fixed to BRI (Basic Rate Interface) (64 kb/s) or HO (384 kb/s) of ISDN), so that the quantity of information transmissible per unit time is constant. Since a picture has large quantity of information, usually, the number of picture elements or the number of frames is reduced on the transmission side, that is, the quantity of information to be transmitted is reduced. When transmitting a high-resolution picture in real time is required for reasons on the reception side, the quantity of transmissible information is limited, so that it is impossible to answer the request.

In the conventional monitoring system in which one central station monitors a plurality of terminal stations, pictures from the plurality of terminal stations are received in the same resolution, and always displayed on a display means of a monitor in the same manner. There is no means for displaying only a picture from one terminal station in close up.

In addition, in the conventional system, since a private line is used as a communication line for the sake of security or mischief prevention, the cost often increases.

SUMMARY OF THE INVENTION

It is therefore an object of the present invention to solve the foregoing problems.

It is another object of the present invention to provide a television conversation/monitoring system in which the use of a communication line is made efficient and transmitted information is made optimum, that is, to provide a television conversation/monitoring system which can perform conversation or monitoring with systems at plurality of places at the same time, with a simple structure and operation and by using a public transmission network; and in which the transmission capacity of information to be transmitted to and received from systems at plurality of places can be changed in accordance with necessity; and in which the system can be protected from operational disturbance, such as erroneous reception of signals sent from general terminals.

In order to attain the foregoing objects, a television conversation/monitoring system according to the present invention has the following structure.

A television conversation/monitoring system includes a central station and a plurality of terminal stations for performing bidirectional communication of pictures, sounds and data signals between the central station and the terminal stations through an ISDN network to thereby carry out conversation or monitoring services. A picture and sound conversation means, a picture input/output means, a sound input/output means, a system control means and an ISDN line terminal device are provided on the central station side. A picture and sound conversation means, a first picture input means, a second picture input means, a picture output means, a sound input/output means, a state change detection means, a system control means and an ISDN line terminal device are provided on each terminal station side.

Further, a call control means for changing the line capacity in accordance with state change information detected by the state change detection means on the terminal station and transmitted to the central station is provided in the central station.

Station numbers allowed to connect are registered in the central and terminal stations respectively in advance in order to use a public network, and each of the stations is not brought into connection to any station the number of which is not yet registered at the time of call setting-up or call incoming.

DESCRIPTION OF THE PREFERRED EMBODIMENTS

Embodiments of the television conversation/monitoring system according to the present invention will be described with reference to the drawings.

(1) Structure of the System

Figure 1:
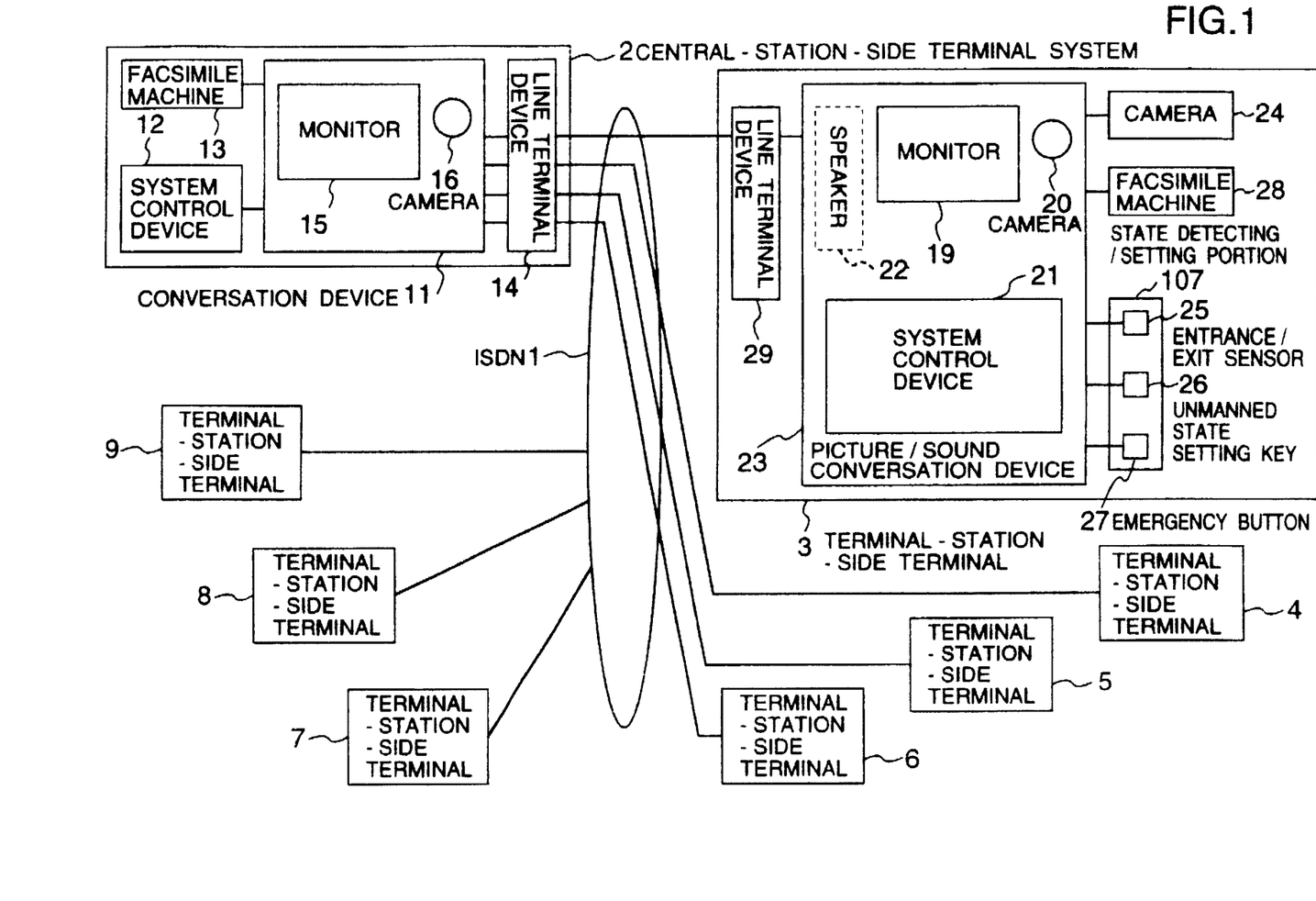
FIG. 1 is a block diagram illustrating the whole structure of an embodiment of a television conversation/monitoring system according to the present invention.

FIG. 1 is a block diagram illustrating the whole structure of the television conversation/monitoring system according to the present invention. The television conversation/monitoring system according to the present invention uses an integrated services digital communication network (hereinafter abbreviated to "ISDN") 1, which is a public line, as a communication line. In the television conversation/monitoring system, a central-station-side terminal system 2 installed in a central station for performing monitoring, control of the system, and so on, and a plurality of terminal-station-side terminal systems 3 to 9 installed in terminal stations which are targets to be monitored and which are far from the central station, are connected through a line such as PRI (primary rate interface) (24B+D) or BRI (basic rate interface) (2B+D) by the ISDN 1. Although the number of the terminal-station-side terminal systems 3 to 9 is seven in this embodiment, the present invention provide a television conversation/monitoring system in which transmission capacity of information transmitted and received between each of a plurality of the terminal-station-side terminal systems 3 to 9 and the central-station-side terminal system 2 is made variable and which is economical, high in the efficiency and superior in the monitoring ability, so that the present invention is not limited in the number of the terminal-station-side terminal systems 3 to 9 in the embodiment shown in FIG. 1, as will be made apparent in the later description.

There is a police network as an example of such a system. A central-station-side terminal is in a police station, and terminal-station-side terminals are in police boxes. When policemen in a police box are on patrol, there is no person in the police box. Such a network as mentioned above is effective not only to guard the police box but also to give facilities to a citizen visiting the police box.

By way of example, as a structure necessary for television conversation/monitoring, the central-station-side terminal system 2 shown in FIG. 1 is constituted by a central-station-side picture/sound conversation device 11 for carrying out conversation with terminal stations by pictures and voices, a central-station-side system control device 12 having a calling button for starting communication with the terminal stations and having functions such as display of the state of the terminal stations, or the like, a facsimile machine 13, as a data communication terminal, for transmitting and receiving data such as character and graphic information, or the like, with the terminal stations, and a central-station-side ISDN line terminal device 14. The central-station-side picture/sound conversation device 11 is constituted by a central-station-side conversation monitor 15 for outputting terminal-station-side pictures, and a central-station-side conversation camera 16 for inputting central-station-side pictures to be transmitted to the terminal station side. With such a structure, the central-station-side terminal system 2 is connected to the respective terminal stations to perform bidirectional conversation/monitoring with pictures and sounds. As the details of the structure will be described later, another device (such as a VTR for recording pictures of a monitoring camera, or a monitor for outputting monitoring pictures) may be added in accordance with the kind and configuration of conversation or monitoring. In the same manner, by way of example, as a structure necessary for television conversation/monitoring, each of the terminal-station-side terminal systems 3 to 9 shown in FIG. 1 is constituted by a terminal-station-side picture/sound conversation device 23 having a terminal-station-side conversation monitor 19 as a picture output means for providing a general visitor information such as guidance, or the like, or pictures of an operator staying at the central station, a terminal-station-side conversation camera 20 as means for inputting pictures of the general visitor, a terminal-station-side system control device 21 and a terminal-station-side speaker 22; a monitoring camera 24 as a picture input means for picking up the image of the whole of the installation place of the terminal-station-side terminal systems 3 to 9; a state detecting/setting portion 107 constituted by an entrance/exit sensor 25 as means for detecting general visitor's entering or leaving the installation place, an unmanned state setting key 26 as a first information means for informing the central station of the unmanned state of the installation place, an emergency button 27 as a second communication means for informing the central station of emergency, and so on; a terminal-station-side facsimile machine 28 in the same manner as in the central station; and a terminal-station-side ISDN line terminal device 29. The terminal-station-side terminal systems 3 to 9 are connected to the central station to perform bidirectional conversation/monitoring with pictures and sounds. Not to say, in the same manner as the central-station-side terminal system 2, an other device (such as a VTR for recording pictures of a monitoring camera, or a monitor for outputting monitoring pictures) may be added in accordance with the kind and configuration of conversation or monitoring. Although any of the terminal-station-side terminal systems 4 to 9 has a basic structure similar to that of the terminal-station-side terminal system 3, detailed configuration thereof (additional devices) may be different from the latter.

Figure 2:
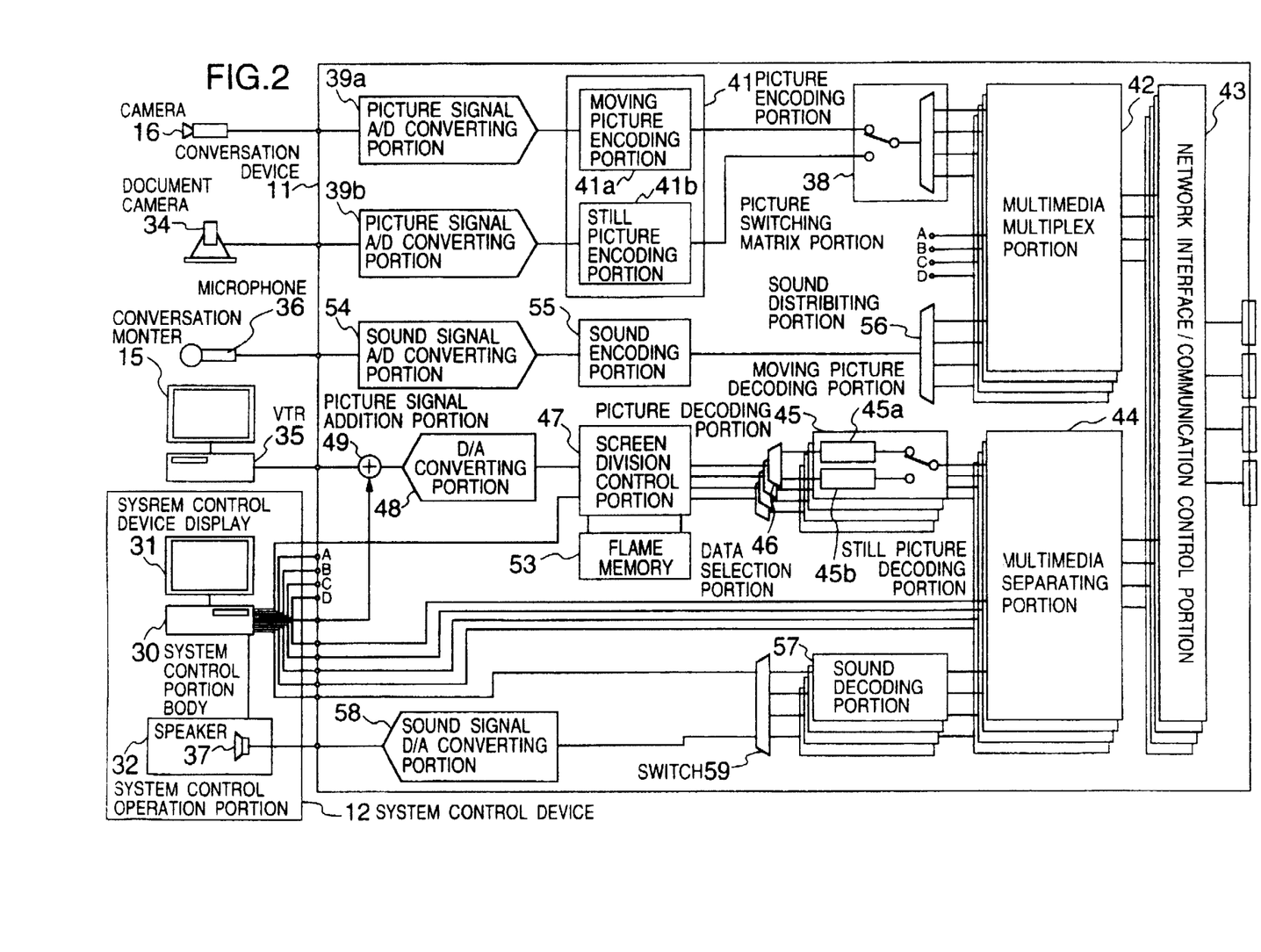
FIG. 2 is a block diagram illustrating the structure of a central-station-side terminal system.

FIG. 2 is a diagram illustrating the block configuration which shows the detailed configuration of an embodiment of a central-station-side terminal system 2 used in a television conversation/monitoring system according to the present invention. This central-station-side terminal system 2 is connected to four terminal stations A to D through the line of an ISDN 1, to thereby perform monitoring the respective terminal stations or conversation with visitors. The central-station-side terminal system 2 is constituted by a central-station-side picture/sound conversation device 11, a central-station-side system control device 12 constituted by a central-station-side system control portion body 30, a system control device display 31 and a system control operation portion 32, a central-station-side conversation monitor 15, a central-station-side conversation camera 16, a document camera 34 for providing pictures (still pictures) such as drawings, or the like, in consideration of convenience of visitors to the terminal stations in addition to the picture (moving picture) provided by the central-station-side conversation camera, a monitoring/recording VTR 35, a conversation microphone 36, and a conversation speaker 37.

The transmission side for transmitting pictures or sounds to the terminal-station-side terminal systems 3 to 9 has (a) a moving picture signal A/D converting portion 39-a for converting a moving picture (analog signal), which is the output of the central-station-side conversation camera 16, to a digital signal, and a still picture signal A/D converting portion 39-b for converting a still picture, which is the output of the document camera 34, to a digital signal, (b) a picture encoding portion 41 constituted by a moving picture encoding portion 41-a and a still picture encoding portion 41-b, and for encoding the digitized picture signals, which are the outputs of the picture signal A/D converting portions 39-a and 39-b, to codes (such as ITU recommendation H221 Standards, and so on) suitable for transmission on the ISDN 1, (c) a picture switching matrix portion 38 for deciding which pictures are to be transmitted to the terminal stations respectively, moving ones or still ones, and for outputting the encoded signals from the picture encoding portion 41 to multimedia multiplex portions 42 which will be described later, (d) a sound signal A/D converting portion 54 for converting a sound signal (analog signal), which is the output of the conversation microphone 36, to a digital signal, (e) a sound encoding portion 55 for inputting and encoding the digital sound signal from the sound signal A/D converting portion 54 in the same manner as the picture signals, (f) a sound distributing portion 56 for distributing and transmitting the encoded signal outputted from the sound encoding portion 55 to the respective terminal stations, (g) a plurality of multimedia multiplex portions 42 provided for every connected terminal station, and for multiplexing the encoded sounds, pictures or control signals in the encoding system which is decided by the picture switching matrix portion 38 and the sound distributing portion 56, and (h) a plurality of network interface/communication control portions 43 provided for every connected terminal station, and for allocating B-channels of ISDN line (PRI) to the terminal stations, so that the signals outputted from the multimedia multiplex portions 42 are transmitted to the terminal stations through the ISDN 1.

The reception side for receiving pictures or sounds from the terminal-station-side terminal systems 3 to 9 has (a) a plurality of multimedia separating portion 44 provided for every connected terminal station, and for separating a communication frame received by the network interface/communication control portions 43 into respective data of sounds, pictures or control signals, (b) a plurality of picture decoding portions 45 provided for every connected terminal station, and constituted by a moving picture decoding portion 45-a for decoding signals where a moving picture has been encoded, and a still picture decoding portion 45-b for decoding signals where a still picture has been encoded, so as to decode the picture signals outputted from the multimedia separating portions 44, (c) a plurality of data selection portions 46 provided for every connected terminal station, and for transmitting the decoded picture data outputted from the picture decoding portions 45 to a screen division control portion 47 in the next stage, (d) the screen division control portion 47 for receiving and storing the picture signals from the plurality of terminal stations through the data selection portion 46, processing the picture signals by use of a frame memory 53 so as to be able to display them together on one screen of the central-station-side conversation monitor 15, and outputting the one-screen picture signal to a D/A converting portion 48 in the next stage, (e) the D/A converting portion 48 for converting the digital picture signal from the screen division control portion 47 to an analog picture signal, (f) a picture signal addition portion 49 for multiplexing a character signal from the central-station-side system control portion body 30 onto the output signal of the D/A converting portion 48, (g) a plurality of sound decoding portions 57 provided for every connected terminal station, and for decoding the sound signals outputted from the multimedia separation control portions 44, and (h) a D/A converting portion 58 for selecting one sound signal from the sound signals through the sound decoding portions 57 by use of a switch 59, and converting the selected digital sound signal to an analog sound signal.

Further, the system control portion body 30 is connected to the multimedia multiplex portions 42, the multimedia separation portions 44, the screen division control portion 47 and the sound switch 59, respectively. Information other than pictures and sounds transmitted from the respective terminal-station-side terminal systems, specifically, state information and state change information are sent to the system control portion body 30 through the network interface/communication control portion 11 and the multimedia separation portions 44. The system control portion body 30 turns on an emergency lamp on the operation portion 32 in accordance with the received state information and state change information. In addition, the system control portion body 30 gives instructions of switching the transmission capacity and calling/disconnecting to the multimedia multiplex portions 42 in accordance with the operation of an operator (pushing a button on the operation portion 32, and so on) or the state change information. In accordance with the instructions, the multimedia multiplex portions 42 make up control signals such as information of switching the transmission capacity. The system control portion body 30 further gives instructions to the screen division control portion 47 and the sound switch 59 to perform expansion/expansion-release of a picture of one terminal station or switching of sound.

Figure 3:
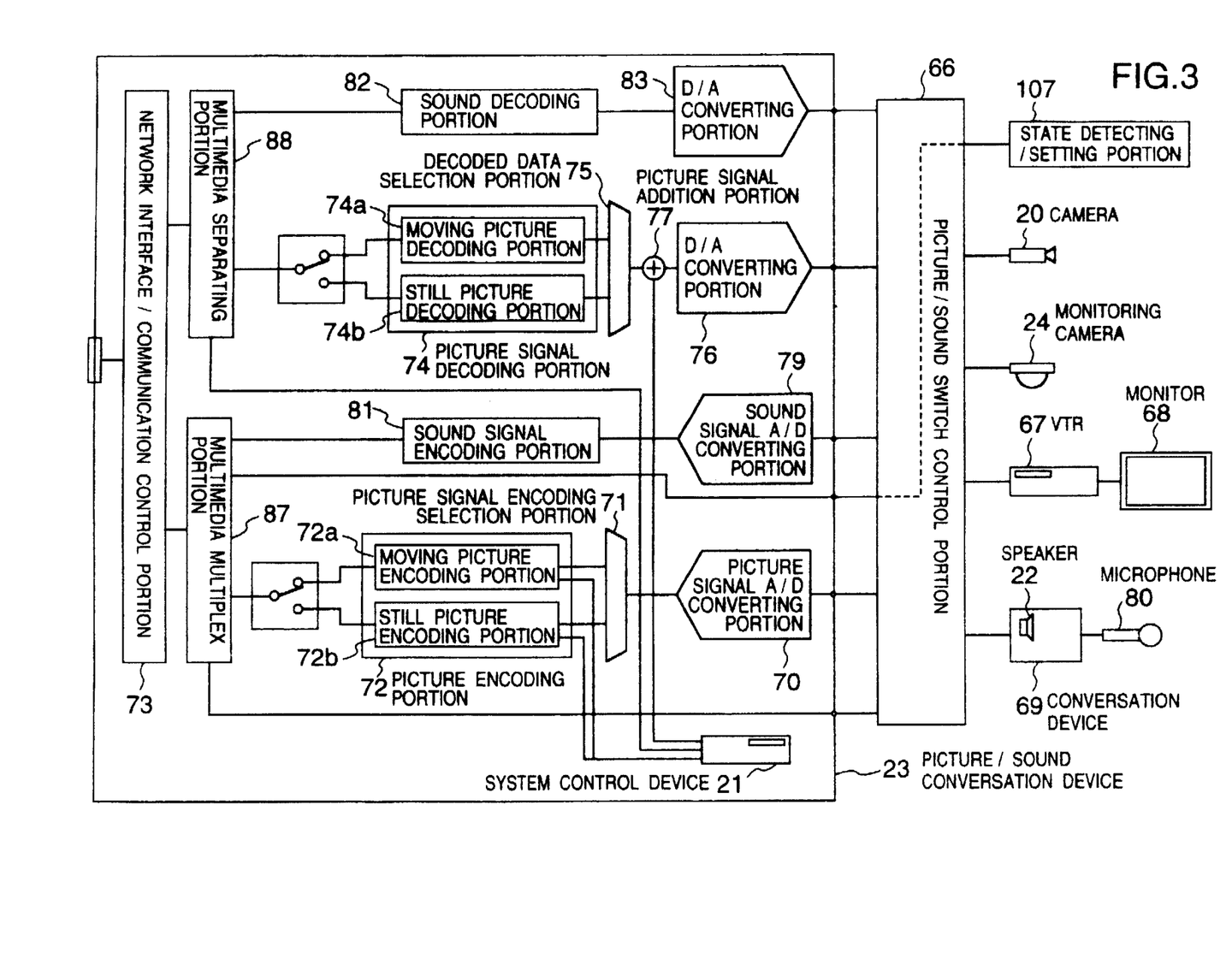
FIG. 3 is a block diagram illustrating the structure of a terminal-station-side terminal system.

FIG. 3 is a diagram illustrating the block structure which shows the detailed structure of an embodiment of the terminal-station-side terminal systems 3 to 9 used in the television conversation/monitoring system according to the present invention. The terminal-station-side terminal system is to monitor a terminal station by a central station or to have a conversation between a visitor and the central station. This embodiment has a structure changed from that of the terminal-station-side terminal system shown in FIG. 1. The terminal-station-side terminal system in this embodiment is constituted by a terminal-station-side picture/sound conversation device 23, a terminal-station-side system control device 21, a picture/sound switch control portion 66, a state detecting/setting portion 107 for the terminal station, constituted by an entrance/exit sensor 25, an unmanned state setting key 26, an emergency button 27 shown in FIG. 1, a monitoring camera 24, a terminal-station-side conversation camera 20, a terminal-station-side monitoring/recording VTR 67, a terminal-station-side monitor 68, and a conversation device 69 having a monitor (corresponding to the reference numeral 19 in FIG. 1) for displaying pictures, and so on, from the central station, a terminal-station-side speaker 22, and so on.

Herein, the terminal-station-side picture/sound terminal device 23 is constituted by the following devices specifically.

The transmission side for transmitting pictures or sounds to the central-station-side terminal system 2 has (a) a picture signal A/D converting portion 70 (to which a signal is inputted through a picture/sound switch control portion 66) for converting a picture analog signal picked up by the terminal-station-side conversation camera 20 to a digital signal, (b) a picture signal encoding selection portion 71 for deciding the encoding system of the digitized picture signal outputted from the picture signal A/D converting portion 70, (c) a picture encoding portion 72 constituted by a moving picture encoding portion 72-a and a still picture encoding portion 72-b, and for encoding the picture signals digitized in the system decided by the picture signal encoding selection portion 71, (d) a sound signal A/D converting portion 79 (to which a signal is inputted through the picture/sound switch control portion 66) for converting a sound signal inputted from a terminal-station-side conversation microphone 80 from an analog sound signal into a digital sound signal, (e) a sound signal encoding portion 81 for inputting and encoding the digital sound signal outputted from the sound signal A/D converting portion 79, (f) a multimedia multiplex portion 87 for multiplexing the encoded sound, picture or control signals, and (g) a network interface/communication control portion 73 for transmitting the signal outputted from the multimedia multiplex portion 87 to the ISDN 1.

On the other hand, the reception side has (a) a multimedia separation portion 88 for separating a communication frame received by the network interface/communication control portion 73 into respective data of sound, picture or control signals, (b) a picture signal decoding portion 74 constituted by a moving picture decoding portion 74-a for decoding a signal where a moving picture has been encoded, and a still picture decoding portion 74-b for decoding a signal where a still picture has been encoded, so as to decode the picture signal outputted from the multimedia separation portion 88, (c) a decoded data selection portion 75 for making a path to transmit the decoded picture data outputted from the picture signal decoding portion 74 to a D/A converting portion in the next stage, (d) a picture signal addition portion 77 for multiplexing a character or picture signal from the system control portion 21 onto the output signal of the decoded data selection portion 75, (e) a D/A converting portion 76 for converting the digital picture signal outputted from the picture signal addition portion 77 into an analog picture signal, (f) a sound decoding portion 82 for decoding the sound signal outputted from the multimedia separation control portion 88, and (g) a D/A converting portion 83 for converting the sound signal outputted from the sound decoding portion 82, from a digital sound signal to an analog sound signal.

As the picture signal decoding method, the same one as the picture decoding system in the central-station-side terminal system 2 is employed.

The state detecting/setting portion 107 makes up state information or state change information in accordance with an input from an accessory key or a sensor, and transmits the state information or state change information to the multimedia multiplex portion 87 through the picture/sound switch control portion 66. The multimedia multiplex portion 87 transmits the state information and the state change information on a D-channel from the network interface/communication control portion 73. The system control device 21 is connected to the multimedia separation portion 88, the moving picture encoding portion 72-a and the still picture encoding portion 72-b, respectively. The information of switching the transmission capacity sent from the central station is sent to the system control device 21 through the multimedia separation portion 88. The system control device 21 sends a resolution correspondingly to the transmission capacity to the moving/still picture encoding portion 72-a/b. The moving/still picture encoding portion 72-a/b changes the encoded signal quantity in accordance with the resolution.

Although a central-station-side terminal is connected to four terminal-station-side terminals simultaneously in FIGS. 1 and 2, the number of terminals connected simultaneously can be changed by changing the structure of the central-station-side terminal.

(2) Operation of the System

Figure 4:
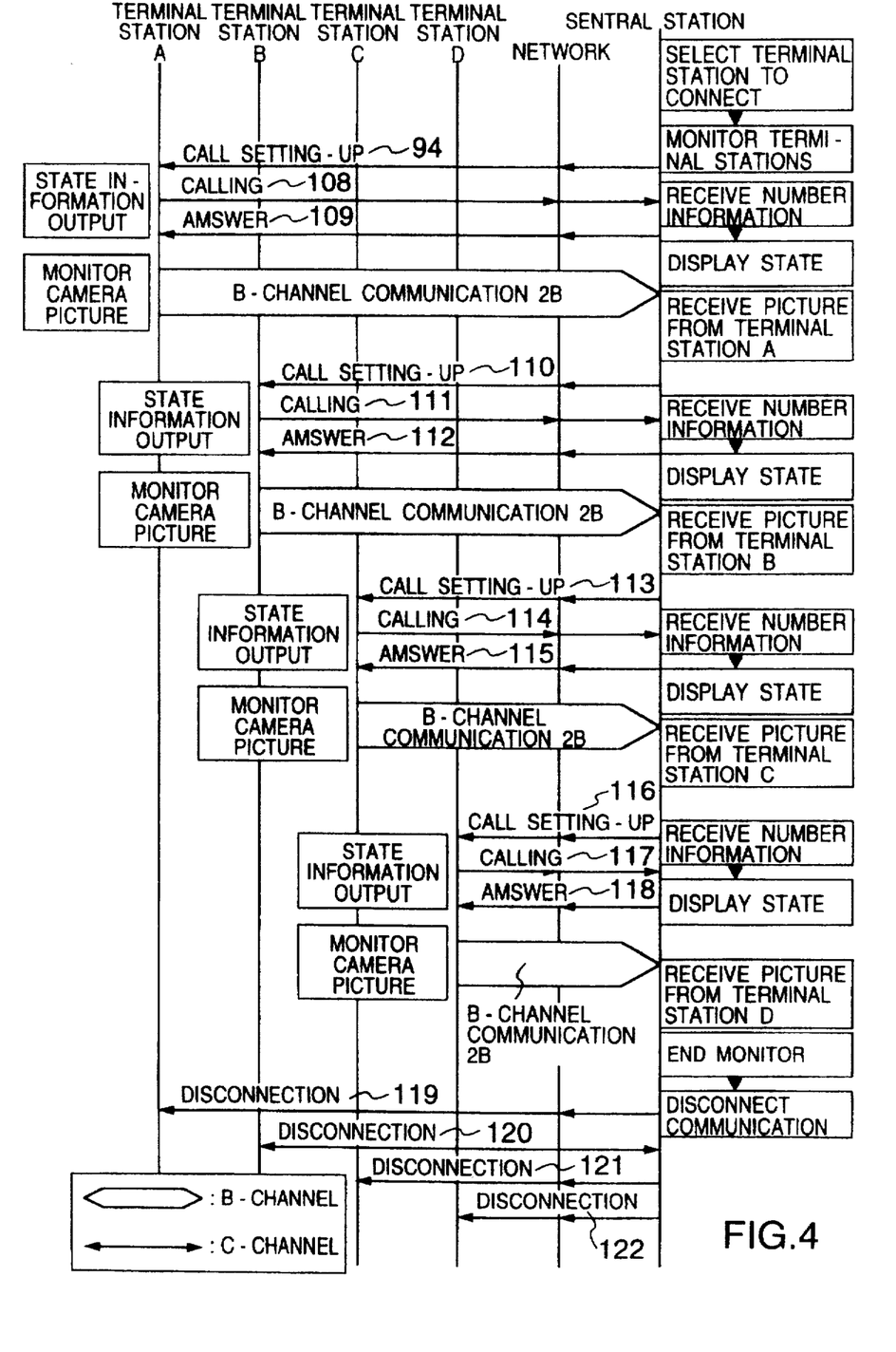
FIG. 4 is an operation sequence diagram illustrating an example of the operation of a television conversation/monitoring system according to the present invention.

FIG. 4 is a sequence diagram showing the procedures of the operation where this system monitors a plurality of terminal stations through pictures. More specifically, the diagram shows the procedures for connecting four terminal stations and a central station through transmission paths respectively having a transmission capacity of 2B of ISDN, transmitting and receiving pictures (not to say, which may include sounds) to thereby monitor normal terminal stations. The operation will be described below. First, in the central-station-side terminal system 2, a terminal station (terminal station A, B, C or D) to be monitored is selected. For example, a calling button (not-shown) for the terminal station A provided in the operation portion 32 of the central-station-side system control device 12 is pushed so that the central station transmits a calling setting-up signal to the terminal station A (94). In response thereto, the terminal station A transmits to the central station side a D-channel calling signal constituted by state information such as information of attendance/absence state of a manager, information of emergency state of the manager of the terminal station A, and so on (108). On the central station side, when the state information of the terminal station A included in this D-channel signal is received, a lamp corresponding to the terminal station A of the state indication portions (not shown) provided in the central-station-side system control device 12 is turned on, and at the same time, a line having the transmission capacity of 2B is connected (109). A picture signal inputted from the monitoring camera 24 in the terminal station A is transmitted from the terminal station side to the central station side by B-channel signal communication. In similar procedures, the terminal stations B to D are connected sequentially. That is, lines having the transmission capacity of 2B are connected in the same procedures as the procedures performed upon the terminal station A (110 to 118). Monitoring pictures from the respective terminal stations are received by the central station, so that it becomes possible to monitor the pictures of the four places simultaneously on the central station side. Disconnection is also performed by pushing a disconnection button of the operation portion 32 of the central-station-side system control device 12 (119 to 122). Not only monitoring but also multicast communication from the central station to the terminal stations and conversation between both the stations can be performed in the same manner.

Figure 5:
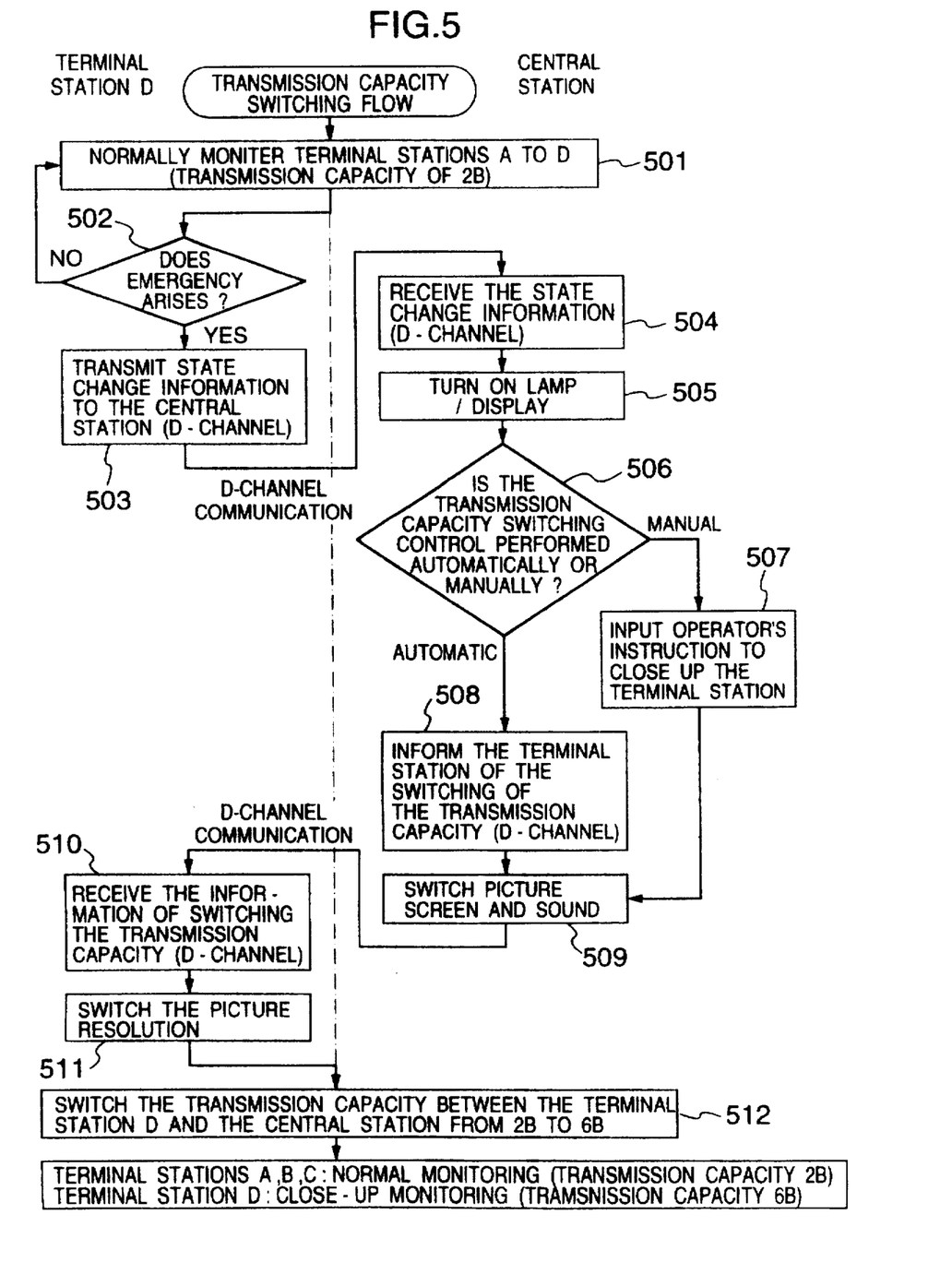
FIG. 5 is a flow chart illustrating processing when the transmission capacity is changed.

FIG. 5 shows a flow from the state of normally monitoring of the four terminal stations till switching the transmission capacity.

The central station and each of the terminal stations A to D are communicating with each other in the transmission capacity of 2B (501). When emergency such as the detection of a sensor, pushing down the emergency button, and so on arises in the terminal station D (502), the terminal station D transmits state change information to the central station through a D-channel (503).

In the central station, when the state change information in the D-channel is received (504), in accordance with the state change information, a message is displayed on the display 31 or a lamp on the system control operation portion 32 is turned on (505). Next, in the case where the state change information belongs to a kind necessary to switch the transmission capacity, the processing is branched into two in accordance with the setting of the central station side (specifically, a flag set in the system control portion body 30) (506). When the setting indicates that the switching control of the transmission capacity is performed manually, an operator inputs an instruction to close up the terminal station D, through the system control operation portion 32 (507). When the setting indicates that the switching control of the transmission capacity is performed automatically, the system control portion body 30 advances the processing of close up in accordance with the state change information. The central station transmits the information of switching the transmission capacity to the terminal station D through the D-channel (508). The system control portion body 30 switches the monitor 16 and the conversation speaker 37 suitably for closing up (509).

In the terminal station D, the information of switching the transmission capacity is received on the D-channel (510), and the resolution of a picture is switched correspondingly to the transmission capacity (511).

The information of switching the transmission capacity is transmitted and received through the D-channel, so that the transmission capacity is switched (512).

Since the transmission capacity is increased from 2B to 6B in FIG. 5, the transmission capacity can be increased without breaking calling which is being set up between the terminal station D and the central station. When the transmission capacity is switched between 6B and H0, it is, however, necessary in the processing of 508 to break calling which is being set up between the terminal station D and the central station once and perform calling setting-up again.

Switching the transmission capacity when close up state is canceled to set close up release, is also performed in the same manner.

In addition, when an operator inputs an instruction on the central station side, switching of the transmission capacity is performed along 507 to 512 regardless to the state change information from the terminal station.

Although the state change information is transmitted through a D-channel in the embodiment of FIG. 5, the state change information may be multiplexed and transmitted together with sounds and pictures by using the B-channel.

Switching the transmission capacity may be defined in the central-station-side system control portion body 30 in advance, and be changed in accordance with necessity.

The transmission capacity may be returned to its original capacity automatically after predetermined time when the transmission capacity is increased once.

Figure 6A:
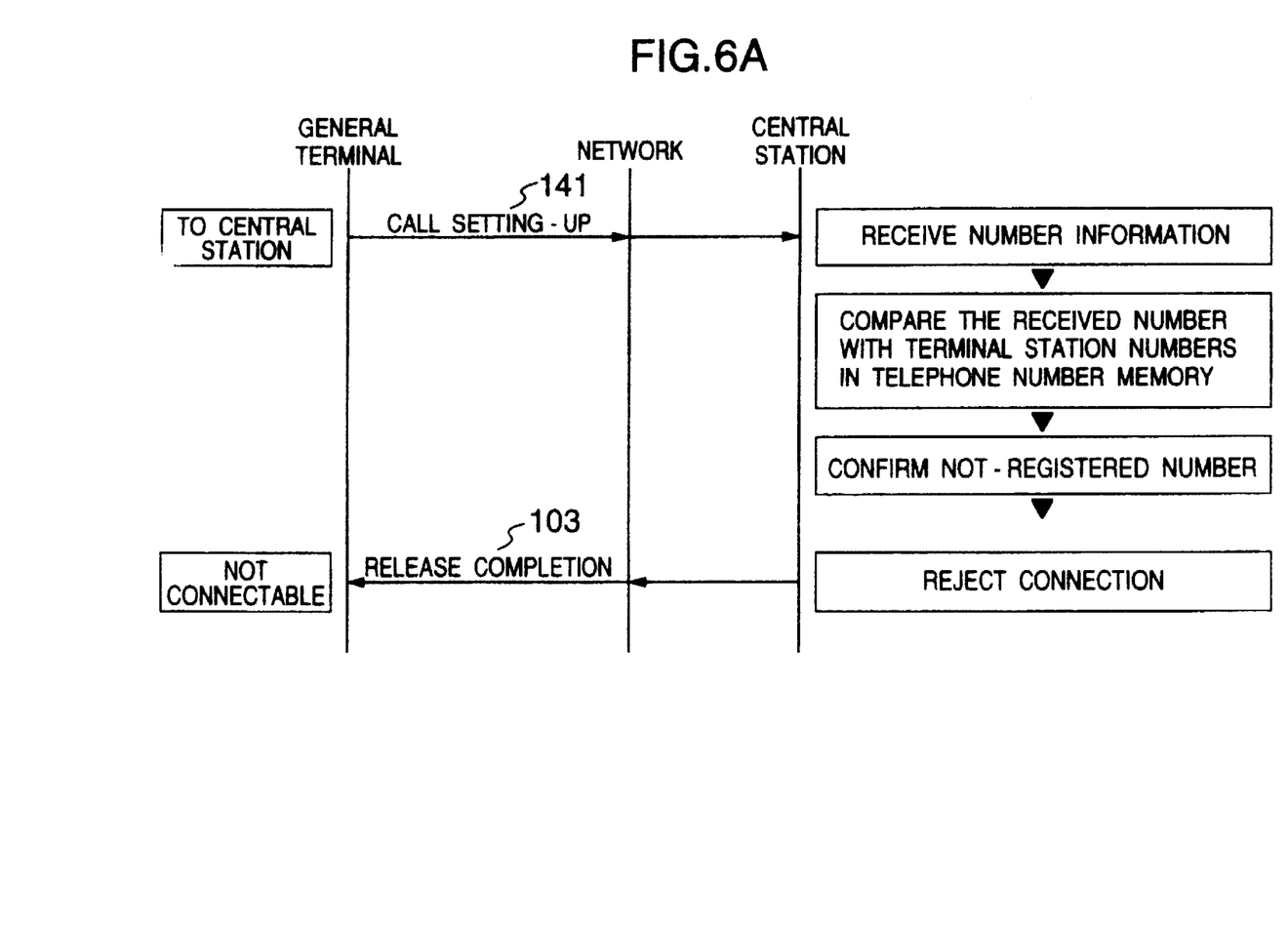
FIGS. 6A and 6B are sequence diagrams illustrating processing when a request for connection is made by an unauthorized terminal.
Figure 6B:
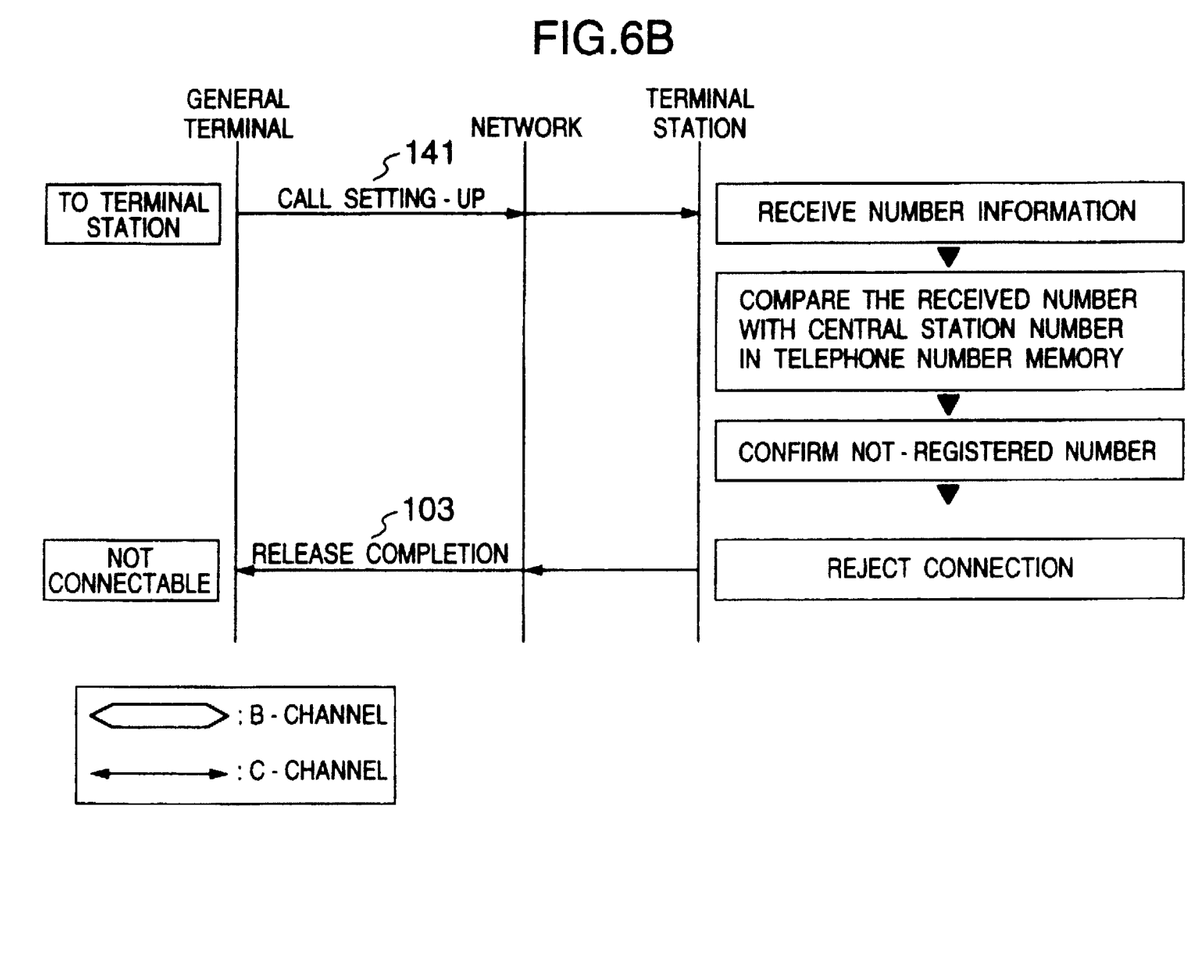

When there is a calling to the television conversation/ monitoring system according to the present invention from a general member joining an ISDN line, for example, from an ISDN-corresponding terminal device such as a digital television telephone, or the like, the system is configured so as to detect the calling and forbids connection therewith in order to maintain or protect the functions of the system. FIG. 6 is a sequence diagram showing an embodiment of this protective operation; FIG. 6A is a diagram showing communication procedures between a general terminal and a central station, and FIG. 6B is a diagram showing communication procedures between a general terminal and a terminal station. Numbers allowed to connect are registered in advance in memories in the central-station-side system control portion body 30 and the terminal-station-side system control device 21.

When a calling setting-up signal is transmitted from a terminal device to a central station or a terminal station through a D-channel (141), the central-station-side system control portion body 30 or the terminal-station-side system control device 21 checks whether transmitting terminal number information included in the D-channel calling setting-up signal indicates a station number registered in advance or not, and in the case of a not-registered number, the central-station-side system control portion body 30 or the terminal-station-side system control device 21 transmits a release completion signal to the general terminal device, and operates not to connect the line (142 and 143). Further, the not-registered number information may be stored, or each of the terminal-station-side terminal systems 3 may transmit the number information to the central-station-side terminal system 2. Consequently, there is, for example, an effect to prevent leakage, tampering, etc. of service contents proper to a guide system, or the like, to which the present invention is applied.

What is claimed is:

1. A television conversation/monitoring system in which a plurality of terminal-station-side terminal systems and one central-station-side terminal system are connected to each other through an integrated service digital communication network so that pictures and sounds are transmitted and received between said terminal-station-side terminal systems and said central-station-side terminal system, wherein each of said plurality of terminal station-side terminal systems includes:

a first picture input means;

a first picture encoding means for encoding a picture signal inputted from said first picture input means;

a first sound input means;

a first sound encoding means for encoding a sound signal inputted from said first sound input means;

a state detection means for outputting a state and a state change in a terminal station as state information and state change information respectively;

a first multimedia multiplex means for multiplexing said picture signal encoded by said first picture encoding means and said sound signal encoded by said first sound encoding means, receiving said state information and said state change information from said state detection means, and transmitting a signal including said picture signal, said sound signal, said state information and said state change information to said communication network;

a first multimedia separation means for separating a signal received from said communication network into a sound signal, a picture signal and other signals;

a first sound decoding means for decoding said sound signal separated by said first multimedia separation means;

a first sound output means for outputting said sound signal decoded by said first sound decoding means;

a first picture decoding means for decoding said picture signal separated by said first multimedia separation means;

a first picture output means for outputing said picture signal decoded by said first picture decoding means; and a first system control means connected to said first multimedia separation means for analyzing the signals other than said sound signal and said picture signal, and controlling the terminal system in accordance therewith, and wherein said central-station-side terminal system includes:

a second picture input means;

a second picture encoding means for encoding a picture signal inputted from said second picture input means;

a second sound input means;

a second sound encoding means for encoding a sound signal inputted from said second sound input means;

a plurality of second multimedia multiplex means the number of which is equal in number to a plurality of said terminal-station-side terminal systems connected simultaneously to said central-station-side terminal system, each of said second multimedia multiplex means multiplexing said picture signal encoded by said second picture encoding means and said sound signal encoded by said second sound encoding means;

a plurality of second multimedia separation means the number of which is equal in number to the plurality of said terminal-station-side terminal systems connected simultaneously to said central-station-side terminal system, each of said second multimedia separation means separating said signal received from said communication network into a sound signal, a picture signal and other signals;

a plurality of second sound decoding means the number of which is equal in number to the plurality of said terminal-station-side terminal systems connected simultaneously to said central-station-side terminal system, each of said second sound decoding means decoding a sound signal separated by a corresponding one of said second multimedia separation means;

a second sound output means for selecting and outputting one of decoded sound signals the number of which is equal in number to the plurality of terminal-station-side terminal systems connected simultaneously;

second picture decoding means the number of which is equal in number to the plurality of terminal-station-side terminal systems connected simultaneously, each of said second picture decoding means decoding a picture signal separated by a corresponding one of said second multimedia separation means:

a second picture output means for combining, into one picture scene, the whole of the decoded picture signals the number of which is equal in number to the plurality of terminal-station-side terminal systems connected simultaneously, and outputting the combined one picture scene; and a second system control means connected to said second multimedia multiplex means and said second multimedia separation means, and for analyzing said state information and said state change information, controlling said terminal-station-side terminal systems, giving instructions to said second multimedia multiplex means in response to a predetermined detected state change as indicated by said state change information to switch during communications the transmission capacity for transmissions with respect to at least one selected terminal-station-side terminal system, and sending transmission capacity switch information to the at least one selected terminal-station-side terminal system;

wherein said central-station-side terminal system communicates with at least a sub-plurality of said terminal-station-side terminal systems simultaneously.

2. A television conversation/monitoring system according to claim 1, wherein said second system control means includes a command input means, and said second system control means gives instructions to corresponding ones of said second multimedia multiplex means to change the transmission capacity in accordance with a command inputted by an operator via said command input means.

3. A television conversation/monitoring system according to claim 1, wherein each of said state detection means of said terminal-station-side terminal systems includes a sensor means for detecting the an entrance and exit of persons into the terminal station, and an emergency notice means, and outputs the output of said sensor means and the state of said emergency notice means as said state change information.

4. A television conversation/monitoring system according to claim 3, wherein said second system control means of said central-station-side terminal system analyzes said state change information transmitted by said terminal-station-side terminal systems, and at the same time gives instructions to ones of said second multimedia multiplex means corresponding to the terminals transmitting said state change information indicating said predetermined detected state change to thereby change the transmission capacities thereof.

5. A television conversation/monitoring system according to claim 1, wherein said first system control means in each of said terminal-station-side terminal systems is connected to said first picture encoding means, and switches the encoding resolution of said first picture encoding means in accordance with a switching transmission capacity when said first system control means receives said transmission capacity switch information.

6. A television conversation/monitoring system according to claim 1, wherein said second system control means in said central-station-side terminal system connected to said second picture output means and said second sound output means, and gives instructions of expansion/expansion-release of corresponding picture plans and switch of sound when the transmission capacity is changed.

7. A television conversation/monitoring system according to claim 1, wherein said first multimedia multiplex means in each of said terminal-station-side terminal systems transmits said state change information through a D-channel.

8. A television conversation/monitoring system according to claim 1, wherein said first multimedia multiplex means in each of said terminal-station-side terminal systems multiplexes said state change information together with said sound signal and said picture signal, and transmits a multiplexed signal through a B-channel.

9. A television conversation/monitoring system according to claim 1, wherein said second system control means of said central-station-side terminal system and said first system control means of said terminal-station-side terminal systems have connection terminal number information, and both said first and second system control means compare transmission terminal information in a D-channel call setting-up signal with said connection terminal number information, perform connection procedures when both information coincide, and perform release completion procedures when both information do not coincide.

10. A method for changing transmission capacity in a television conversation/monitoring system for transmitting and receiving pictures and sounds between a plurality of terminal-station-side terminal systems and a central-station-side terminal system, which are connected to each other through an integrated service digital communication network, comprising:

the step of conducting simultaneous communications between at least a sub-plurality of said terminal-station-side terminal systems and said central-station-side terminal system;

the step in which each of said terminal-station-side terminal systems transmits state change information when the state of the terminal station is changed; and the step in which said central-station-side terminal system changes during communications the transmission capacity for transmissions with respect to at least one selected terminal-station-side terminal system in accordance with said received state change information.

11. A television conversation/monitoring system in which a plurality of terminal-station-side terminal systems and one central-station-side terminal system are connected to each other through an integrated service digital communication network so that pictures and sounds are transmitted and received between said terminal-station-side terminal systems and said central-station-side terminal system, wherein each of said plurality of terminal station-side terminal systems includes:

a first picture input means;

a first picture encoding means for encoding a picture signal inputted from said first picture input means;

a first sound input means;

a first sound encoding means for encoding a sound signal inputted from said first sound input means;

a state detection means for outputting a state and a state change in a terminal station as state information and state change information respectively;

a first multimedia multiplex means for multiplexing said picture signal encoded by said first picture encoding means and said sound signal encoded by said first sound encoding means, receiving said state information and said state change information from said state detection means, and transmitting a signal including said picture signal, said sound signal, said state information and said state change information to said communication network;

a first multimedia separation means for separating a signal received from said communication network into a sound signal, a picture signal and other signals;

a first sound decoding means for decoding said sound signal separated by said first multimedia separation means;

a first sound output means for outputting said sound signal decoded by said first sound decoding means;

a first picture decoding means for decoding said picture signal separated by said first multimedia separation means;

a first picture output means for outputing said picture signal decoded by said first picture decoding means; and a first system control means connected to said first multimedia separation means for analyzing the signals other than said sound signal and said picture signal, and controlling the terminal system in accordance therewith, and wherein said central-station-side terminal system includes:

a second picture input means;

a second picture encoding means for encoding a picture signal inputted from said second picture input means;

a second sound input means;

a second sound encoding means for encoding a sound signal inputted from said second sound input means;

a plurality of second multimedia multiplex means the number of which is equal in number to a plurality of said terminal-station-side terminal systems connected simultaneously to said central-station-side terminal system, each of said second multimedia multiplex means multiplexing said picture signal encoded by said second picture encoding means and said sound signal encoded by said second sound encoding means;

a plurality of second multimedia separation means the number of which is equal in number to the plurality of said terminal-station-side terminal systems connected simultaneously to said central-station-side terminal system, each of said second multimedia separation means separating said signal received from said communication network into a sound signal, a picture signal and other signals;

a plurality of second sound decoding means the number of which is equal in number to the plurality of said terminal-station-side terminal systems connected simultaneously to said central-station-side terminal system, each of said second sound decoding means decoding a sound signal separated by a corresponding one of said second multimedia separation means;

a second sound output means for selecting and outputting one of decoded sound signals the number of which is equal in number to the plurality of terminal-station-side terminal systems connected simultaneously;

second picture decoding means the number of which is equal in number to the plurality of terminal-station-side terminal systems connected simultaneously, each of said second picture decoding means decoding a picture signal separated by a corresponding one of said second multimedia separation means;

a second picture output means for combining, into one picture scene, the whole of the decoded picture signals the number of which is equal in number to the plurality of terminal-station-side terminal systems connected simultaneously, and outputting the combined one picture scene; and a second system control means connected to said second multimedia multiplex means and said second multimedia separation means, and for analyzing said state information and said state change information, controlling said terminal-station-side terminal systems, giving instructions to said second multimedia multiplex means in response to a predetermined detected state change as indicated by said state change information to switch during communications the transmission capacity selectably to a higher transmission capacity or a lower transmission capacity for transmissions with respect to at least one selected terminal-station-side terminal system, and sending transmission capacity switch information to the at least one selected terminal-station-side terminal system;

wherein said central-station-side terminal system communicates with at least a sub-plurality of said terminal-station-side terminal systems simultaneously and selectably switches transmission capacitors overtime to both said higher transmission capacity and said lower transmission capacity.

12. A method for changing transmission capacity in a television conversation/monitoring system for transmitting and receiving pictures and sounds between a plurality of terminal-station-side terminal systems and a central-station-side terminal system, which are connected to each other through an integrated service digital communication network; comprising:

the step of conducting simultaneous communications between at least a sub-plurality of said terminal-station-side terminal systems and said central-station-side terminal system;

the step in which each of said terminal-station-side terminal systems transmits state change information when the state of the terminal station is changed; and the step in which said central-station-side terminal system changes during communications the transmission capacity selectably to a higher transmission capacity or a lower transmission capacity for transmissions with respect to at least one selected terminal-station-side terminal system in accordance with said received state change information; wherein said contrast-station-side terminal system and selectably switches transmission capacitors overtime to both said higher transmission capacity and said lower transmission capacity.

* * * * *